United States Patent

Jenvey

[15] 3,680,443
[45] Aug. 1, 1972

[54] STEERING MECHANISM FOR MOTOR VEHICLES

[72] Inventor: Leslie Richard Jenvey, Reading, England

[73] Assignee: Adwest Engineering Limited

[22] Filed: Nov. 17, 1969

[21] Appl. No.: 877,219

[30] Foreign Application Priority Data

Nov. 15, 1968 Great Britain............54,467/68

[52] U.S. Cl.....................91/375 A, 92/136, 74/422, 74/498
[51] Int. Cl............................F15b 9/10, F01b 9/00
[58] Field of Search.......92/136, 138; 91/375, 375 A; 74/422, 498; 180/79.2

[56] References Cited

UNITED STATES PATENTS 3,157,061  11/1964  Parker............................74/498
3,554,048  1/1971  Adams............................74/498
2,192,175  3/1940  Ballard...........................92/136
2,369,324  2/1945  Thompson.......................91/375
2,844,128  7/1958  Steiner...........................92/136

*Primary Examiner*—Paul E. Maslousky
*Attorney*—Larson, Taylor & Hinds

[57] ABSTRACT

A rack and pinion steering mechanism for motor vehicles is provided in which the machining of the rack is facilitated and the effective length of the unit is reduced with a reduction in the distance between the centers of the two ball joints. The unit comprises a carrier, a toothed rack pivotally mounted by one of its ends on the carrier, which is slideable within the casing a pinion carried by the casing engages the toothed rack; and a resilient device urges the toothed rack into mesh with the pinion.

9 Claims, 2 Drawing Figures

3,680,443

3,680,443

STEERING MECHANISM FOR MOTOR VEHICLES

BACKGROUND OF THE INVENTION

This invention relates to steering mechanism for motor vehicles and is more particularly concerned with rack and pinion steering mechanism in a large motor vehicle, such as a truck or bus, the size of rack necessary to withstand the working loads gives rise to difficulties in machining the rack.

Furthermore packing difficulty can arise caused by the length of the rack and pinion unit. The object of the present invention is faciliate the machining of the rack and to reduce the effective length of the rack and pinion unit with a consequent reduction in the distance between the centers of the two ball joints normally mounted either on the two ends of the rack or extensions of the rack.

According to the present invention the rack and pinion unit comprises:
 a. a carrier,
 b. a toothed rack pivotally mounted by one of its ends on said carrier,
 c. a casing,
 d. the carrier is slideable within said casing and has its ends projecting from the casing,
 e. a pinion carried by the casing engages the toothed rack; and
 f. a resilient device urges the toothed rack into mesh with the pinion.

Figure 1:
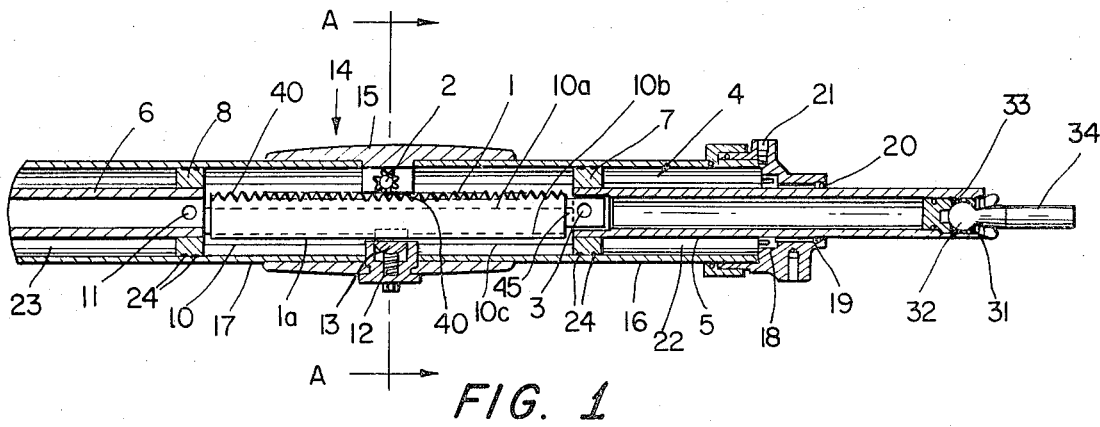
FIG. 1 is a sectional elevation of a rack and pinion unit constructed according to the invention and is a section on line B—B of FIG. 2.

DETAILED DESCRIPTION OF THE ARRANGEMENT:

A rack and pinion unit has a toothed rack 1 with teeth 40 engaged by a pinion 2 and is pivotally mounted by one of its ends 45 by a pin 3 on a carrier 4. End 45 has a diameter smaller than rack 1 and is integral therewith.

Figure 2:
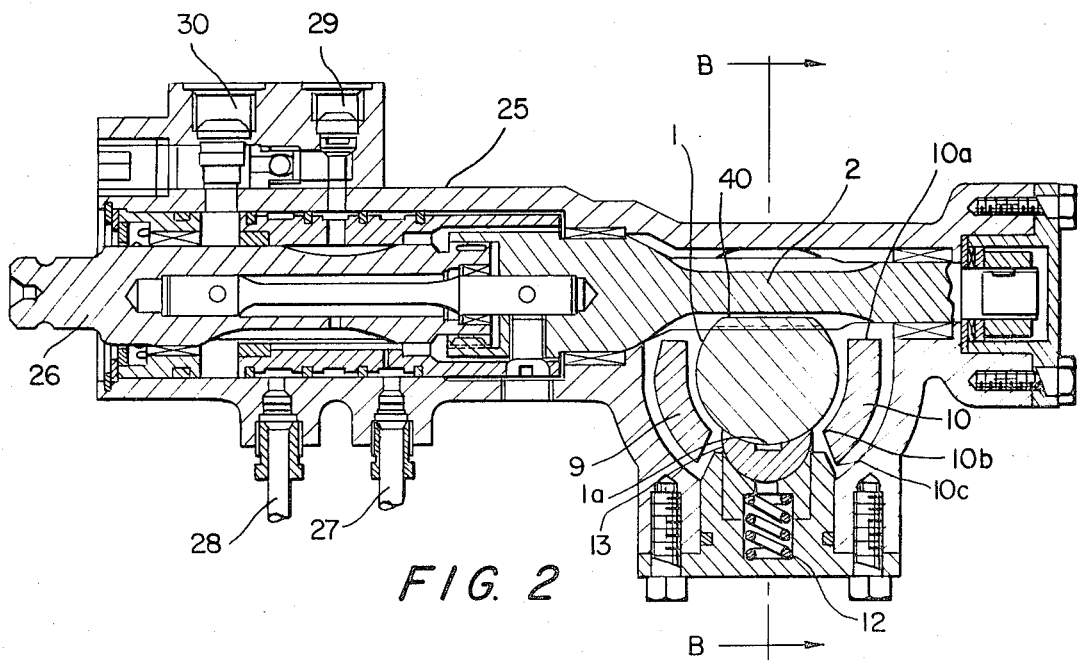
FIG. 2 is a section on line A—A of FIG. 1.

The carrier 4 comprises first and second members 5 and 6 in the form of tubes, two pistons 7 and 8 and a third or intermediate member in the form of two mutually parallel spaced apart bars 9 and 10 are cast in one piece. Bars 9 and 10 have substantially the same cross-sectional shape. With reference to FIG. 2, bar 10 has a horizontal top 10a, an inner arcuate side and an outer arcuate side intersecting at edges 10b and 10c, respectively, an upwardly inclined bottom that is oblique with top 10a. The pistons 7 and 8 are secured to the respective inner ends of the tubes 5 and 6 by the pin 3 and a pin 11.

The rack 1 is urged into mesh against the pinion 2 by a coil spring 12 acting through a pad 13 bearing on the bottom 1a of rack 1 to take up wear in the teeth of the rack and/or pinion. The rack 1 can thus pivot about the pin 3 in the directions indicated by arrows in FIG. 1 and can also move a limited amount in a direction normal to the plane of the drawing by sliding along the pin 3.

The rack 1 and carrier 4 are contained in a casing 14 which comprises a central housing 15 which carries the pinion 2, and two tubes 16 and 17 each of which is a shrink fit in the central housing 15.

The two tubes 5 and 6 pass out of the end of the tubes 16 and 17 respectively through U-sectioned packing seals 18 (only one shown) and a bearing 19 (only one shown) which is provided with a scraper and/or wiper 20 adjacent to it, to clean the outer surfaces of the tubes 5 and 6 which are hardened and plated, and prevent dirt from entering the tubes 16 and 17, no rubber gaiter or bellows as is in the usual practice, is employed.

Each tube 16 and 17 has a liquid inlet 21 (only one shown) for the introduction of pressurized liquid into chambers 22 and 23 formed by the pistons 7 and 8. The pistons 7 and 8 carry seals 24.

A rotary valve 25 that is well known in the art and (FIG. 2) of the kind disclosed in British Pat. No. 818,483 is mounted between the pinion 2 and the lower end of a steering column (not shown) so that the rotation of the steering rotates the pinion 2 through the rotor 26 of the valve 25. Rotation of the rotor 26 allows pressurized liquid to be supplied to either the chamber 22 or 23 through an outlet 27 or 28 depending upon whether the steering column is rotated in one direction or the other, so as to provide power-assistance in moving rack 1 and carrier 4.

The pressurized liquid is supplied by a pump (not shown) to an inlet 29 of the valve body and the liquid is returned to a reservoir through an outlet 30.

The outer end of each of the two tubes 5 and 6 is adapted to house a ball-joint 31 (only one shown). Each balljoint 31 includes a ball 32 and socket 33. The ball 32 has an extension 34 for connection to a steering linkage. By housing the ball-joints within the tubes 5 and 6 a reduction in the distance between these two ball-joints is achieved, this facilitating "packaging".

In operation all end thrusts on the rack and pinion unit are taken by the tubes 5 and 6, pistons 7 and 8 and bars 9 and 10 which can be made relatively massive without introducing manufacturing difficulties. In contrast the toothed rack 1, which has to be machined, can be made relatively short and light thus facilitating its manufacture. The rack and pinion unit of the invention has the following advantages.

1. The rack and pinion unit can be used independently on a beam axle.
2. The unit can be used on a beam axle with any type of reduction box for example a pair of spur gears.
3. The unit can be used on an independent suspension wishbone or trailing or leading arm leaf spray suspension.
4. The control valve can be located remote from the rack.
5. Other types of valves, of either rotary or spool type can be used.
6. The unit can be used with a hydrostatic control system.
7. In the unit the pinion is central. This has advantage in that handling (left and right hand drive vehicles) is eliminated.
8. The gear track of the rack and pinion can be with straight spur gear teeth or helical spur gear teeth. The unit can either be rigidly mounted or elastomerically mounted.

What I claim is:

1. A rack and pinion steering mechanism for a motor vehicle, the mechanism comprising a casing, a carrier mounted for longitudinal movement within said casing, a toothed rack pivotally connected by one of its ends to the carrier, a pinion rotatably mounted in said casing and adapted for connection to the steering control of a motor vehicle for rotation thereby, and means for resiliently urging the toothed rack into meshing engagement with the pinion, whereby when the pinion is rotated the toothed rack and the carrier will be moved longitudinally relative to the casing in a direction dependent upon the direction of rotation of the pinion, said carrier comprising a first member extending on one side of said toothed rack and to which said toothed rack is pivotally connected, a second member extending on the other side of the toothed rack, and at least one intermediate member substantially parallel with said toothed rack and connecting the first and second members.

2. A rack and pinion steering mechanism according to claim 1, wherein said first member is in substantial axial alignment with the toothed rack and said second member.

3. A rack and pinion steering mechanism according to claim 2, wherein the first and second members are connected by two intermediate members in the form of spaced bars and wherein the toothed rack is arranged between said bars.

4. A rack and pinion steering mechanism according to claim 2, wherein said first and second members each have a piston on that end thereof adjacent the toothed rack and wherein said casing defines cylinders in which the pistons are slidable, means being provided for directing fluid under pressure to a selected one of said cylinders dependent upon the direction of rotation of the pinion so that the fluid will act on the appropriate piston and provide power assistance in moving the rack and the carrier.

5. A rack and pinion unit as claimed in claim 4 in which said intermediate member and said two pistons are cast in one piece.

6. A rack and pinion unit as claimed in claim 5, in which said third member comprises two mutually parallel spaced apart bars.

7. A rack and pinion steering mechanism according to claim 2, wherein said first member extends through an aperture in an end wall of the housing and wherein the extending outer end of the first member is hollow and houses a ball-joint.

8. A rack and pinion steering mechanism according to claim 2, wherein said second member extends through an aperture in an end wall of the housing and wherein the extending outer end of the second member is hollow and houses a ball-joint.

9. A rack and pinion steering mechanism according to claim 1, wherein double-acting piston-and-cylinder means are associated with the carrier and wherein means is provided for directing fluid under pressure to the appropriate side of the double-acting piston-and-cylinder means according to the direction of rotation of the pinion to provide power assistance in moving the rack and the carrier when the pinion is rotated.

* * * * *